(12) United States Patent
Iwasaki et al.

(10) Patent No.: US 7,431,999 B2
(45) Date of Patent: Oct. 7, 2008

(54) PERPENDICULAR MAGNETIC RECORDING MEDIUM AND MAGNETIC RECORDING/REPRODUCING APPARATUS

(75) Inventors: Takeshi Iwasaki, Kanagawa (JP); Akira Kikitsu, Kanagawa (JP); Soichi Oikawa, Kanagawa (JP); Tomoyuki Maeda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 485 days.

(21) Appl. No.: 11/081,937

(22) Filed: Mar. 17, 2005

(65) Prior Publication Data

US 2005/0214588 A1    Sep. 29, 2005

(30) Foreign Application Priority Data

Mar. 25, 2004    (JP) .............................. 2004-090673

(51) Int. Cl.
G11B 5/66    (2006.01)

(52) U.S. Cl. ...................................... 428/831

(58) Field of Classification Search ................ 428/831, 428/831.2, 832.1, 832.3
See application file for complete search history.

(56) References Cited

U.S. PATENT DOCUMENTS

| | | | |
|---|---|---|---|
| 6,468,670 B1 * | 10/2002 | Ikeda et al. | 428/611 |
| 6,746,749 B2 * | 6/2004 | Kirino et al. | 428/832 |
| 6,749,955 B2 * | 6/2004 | Kirino et al. | 428/832.1 |
| 2003/0064249 A1 | 4/2003 | Uwazumi et al. | |
| 2003/0064253 A1 | 4/2003 | Uwazumi et al. | |
| 2003/0152809 A1 | 8/2003 | Oikawa et al. | |
| 2003/0157375 A1 | 8/2003 | Uwazumi et al. | |
| 2004/0000374 A1 | 1/2004 | Watanabe et al. | |
| 2004/0018391 A1 | 1/2004 | Lee et al. | |
| 2004/0191466 A1 | 9/2004 | Iwasaki et al. | |
| 2004/0224185 A1 | 11/2004 | Nakamura et al. | |

FOREIGN PATENT DOCUMENTS

| | | |
|---|---|---|
| JP | 10-182263 A | 7/1998 |
| JP | 2001-134930 A | 5/2001 |
| JP | 2001-256640 A | 9/2001 |
| JP | 2002-163819 A | 7/2002 |
| JP | 2003-036525 A | 2/2003 |
| JP | 2003-228809 A | 8/2003 |

OTHER PUBLICATIONS

Chinese Patent Office, "Notification of First Office Action," 3 pp. (Aug. 11, 2006).

* cited by examiner

*Primary Examiner*—Holly Rickman
(74) *Attorney, Agent, or Firm*—Pillsbury Winthrop Shaw Pittman LLP (57) ABSTRACT

Disclosed is a perpendicular magnetic recording medium including: a nonmagnetic substrate; a first underlayer formed on the nonmagnetic substrate, mainly composed of at least two kinds selected from a group consisting of $Fe_2O_3$, $Co_3O_4$, MgO, $MoO_3$, $Mn_3O_4$, $SiO_2$, $Al_2O_3$, $TiO_2$, and $ZrO_2$, and having crystal grains growing in a columnar shape and crystal grain boundaries surrounding the crystal grains; a nonmagnetic second underlayer formed on the first underlayer and having crystal grains with one of a face-centered cubic structure and a hexagonal close-packed structure growing on the crystal grains of the first underlayer; a magnetic layer formed on the second underlayer; and a protective film formed on the magnetic layer.

18 Claims, 6 Drawing Sheets

70 PERPENDICULAR MAGNETIC RECORDING MEDIUM
15 PROTECTIVE LAYER
14 PERPENDICULAR MAGNETIC LAYER
16 THIRD UNDERLAYER
13 SECOND UNDERLAYER
12 FIRST UNDERLAYER
17 SOFT MAGNETIC LAYER
18 BIASING LAYER
19 BACKING NONMAGNETIC LAYER
1 NONMAGNETIC SUBSTRATE

FIG. 11

80 PERPENDICULAR MAGNETIC RECORDING MEDIUM
25 PROTECTIVE LAYER
24 PERPENDICULAR MAGNETIC LAYER
23 SECOND UNDERLAYER
22 FIRST UNDERLAYER
1 NONMAGNETIC SUBSTRATE

PERPENDICULAR MAGNETIC RECORDING MEDIUM AND MAGNETIC RECORDING/REPRODUCING APPARATUS

CROSS REFERENCE TO RELATED APPLICATIONS

This application is based upon and claims the benefit of priority from the prior Japanese Patent Application No. 2004-90673, filed on Mar. 25, 2004; the entire contents of which are incorporated herein by reference.

BACKGROUND

1. Field of the Invention

The present invention relates to a magnetic recording medium used for a hard disk device using a magnetic recording technology and to a magnetic recording/reproducing apparatus using the same.

2. Description of the Related Art

A problem of increase in noise generated from a medium has arisen as recording density becomes higher in response to a demand for a larger capacity of a hard disk device. The noise from a medium is thought to be ascribable mainly to zigzag magnetic domain walls in bit boundaries. This is because various factors such as a writing magnetic field of a head and the size of grains constituting an internal part of the medium are involved in determining the shapes of bits, and especially due to variation in grain size, positions where the bit boundaries are formed are not fixed. For noise reduction, irregularities of the recording bit boundaries have to be minimized. One way of making the irregularities of the recording bit boundaries small is to make magnetic grains forming a magnetic layer microscopic.

However, when the magnetic grains become more microscopic on one hand, a problem of deterioration in thermal fluctuation resistance occurs on the other. Here, realizing uniform grain size distribution of the grains is an effective way for making the irregularities of the boundaries of the recording bits smaller without deteriorating the thermal fluctuation resistance of the magnetic grains. However, it is thought to be difficult for a currently available film forming technology to make the grain size distribution uniform while keeping the crystal grain size at a current level (about 10 nm) or smaller.

As an art for obtaining a microscopic and uniform film, an art of forming microscopic and uniform pores made of $SiO_2$ is disclosed in a catalyst field (see, for example, Patent document 1 below).

In this prior art, by annealing in an oxygen atmosphere after film deposition, a microscopic film having $Fe_2O_3$ grains and $SiO_2$ grain boundaries is formed and this film is acid-etched, so that a film having the microscopic pores of $SiO_2$ can be formed. However, this prior art is an art relating to a ceramic film having one-dimensional through pores and requires heat treatment and so on in an atmosphere which takes several to several ten hours, and thus cannot be easily applied to manufacture of magnetic recording media where a great importance is put on mass production and a film is formed mainly in a vacuum.

In another disclosed magnetic recording medium, a base film of the magnetic recording medium has a honeycomb structure composed of: crystal grains of cobalt oxide, ferric oxide, chromium oxide, and nickel oxide; and crystal grain boundaries of silicon oxide, aluminum oxide, titanium oxide, tantalum oxide, and zinc oxide, and a control layer made of magnesium oxide, a chromium alloy, and a nickel alloy (see, for example, Patent documents 2 and 3 below).

The above prior art discloses an art relating to a magnetic recording medium that utilizes an electron cyclotron resonance (ECR) sputtering method to form the base film with the honeycomb crystal grain structure, and this base film is more uniform than that formed by a typical sputtering method. Further, it is also disclosed that the magnetic recording medium has, between the underlayer and a magnetic layer, a lattice constant control layer for adjusting a mismatch between crystal lattices of these layers, thereby inhibiting reduction in magnetic coercive force and change in magnetic characteristic caused by the mismatch between the crystal lattices. It is stated that a recording density exceeding 40 Gbits/inch$^2$ is attained.

Here, in a metal oxide, there generally exist oxides that are stable under room temperature and atmospheric pressure and are different in oxidation number. For example, in a cobalt oxide, CoO, $Co_3O_4$, and so forth exist, and in a ferric oxide, FeO, $Fe_2O_3$, $Fe_3O_4$, and so forth exist. Neither of the above prior arts particularly discloses information on the oxidation number (valency of metal).

In order to achieve a still higher recording density exceeding 100 Gbits/inch$^2$, a magnetic film having more uniform and microscopic crystal grains has to be formed. For this, it is desired that still more uniform and microscopic crystal grains should be formed as a underlayer. However, neither of the above prior arts can be said to have fully realized the formation of uniform and microscopic crystal grains to make magnetic grains of a recording layer more microscopic and uniform, that is, they cannot be said to have fully achieved still higher recording density exceeding 100 Gbits/inch$^2$.

Further, Patent document 4 below discloses an invention relating to a perpendicular magnetic recording medium that has, between a soft magnetic underlayer and a magnetic recording layer, a film magnetically isolated in an in-plane direction and made of semihard ferrite or a soft magnetic granular film. This invention is characterized in that, as the semihard ferrite, $\gamma$-$Fe_2O_3$ or $Fe_3O_4$ is used, and the soft magnetic granular film is composed of soft magnetic grains and a nonmagnetic base, the soft magnetic grains being made of at least one kind of material selected from Co, Fe, and Ni, and the nonmagnetic base being made of a material selected from $SiO_2$, $Al_2O_3$, C, and $ZrO_2$.

In the above prior art, microscopic grains with a semihard or soft magnetic property are intended for collecting a magnetic field steeply from a head, and no implication is given that the formation of fully uniform and microscopic crystal grains of this underlayer is intended for achieving still higher density recording.

[Patent Document 1] Japanese Patent Laid-open Application No. Hei 10-182263

[Patent Document 2] Japanese Patent Laid-open Application No. 2001-134930

[Patent Document 3] Japanese Patent Laid-open Application No. 2002-163819

[Patent Document 1] Japanese Patent Laid-open Application No. 2003-228809

SUMMARY

It is an object of the present invention to overcome the problems in the above-described prior arts such as large grain size distribution and crystallinity deterioration in making magnetic grains of a magnetic layer in a magnetic recording medium more microscopic, and to provide a magnetic recording medium having a microscopic magnetic layer with small grain distribution and good crystallinity.

A perpendicular magnetic recording medium according to an aspect of the present invention includes: a nonmagnetic substrate; a first underlayer formed on the nonmagnetic substrate, mainly composed of two kinds or more selected from a group consisting of $Fe_2O_3$, $Co_3O_4$, MoO, $MgO_3$, $Mn_3O_4$, $SiO_2$, $Al_2O_3$, $TiO_2$, and $ZrO_2$, and having crystal grains growing in a columnar shape and crystal grain boundaries surrounding the crystal grains; a nonmagnetic second underlayer formed on the first underlayer and having crystal grains with one of a face-centered cubic structure and a hexagonal close-packed structure growing on the crystal grains of the first underlayer; a magnetic layer formed on the second underlayer; and a protective film formed on the magnetic layer.

A magnetic recording/reproducing apparatus according to another aspect of the present invention includes a perpendicular magnetic recording medium that includes a nonmagnetic substrate; a first underlayer formed on the nonmagnetic substrate, mainly composed of two kinds or more selected from a group consisting of $Fe_2O_3$, $Co_3O_4$, MgO, $MoO_3$, $Mn_3O_4$, $SiO_2$, $Al_2O_3$, $TiO_2$, and $ZrO_2$, and having crystal grains growing in a columnar shape and crystal grain boundaries surrounding the crystal grains; a nonmagnetic second underlayer formed on the first underlayer and having crystal grains with one of a face-centered cubic structure and a hexagonal close-packed structure growing on the crystal grains of the first underlayer; a magnetic layer formed on the second underlayer; and a protective film formed on the magnetic layer; a mechanism supporting and rotary-driving the perpendicular magnetic recording medium; a magnetic head having an element recording data to the perpendicular magnetic recording medium and an element reproducing recorded data from the perpendicular magnetic recording medium; and a carriage assembly supporting the magnetic head movably relative to the perpendicular magnetic recording medium.

DETAILED DESCRIPTION

EXPLANATION ON EXAMPLES

Embodiments of the present invention will be described with reference to the drawings, but these drawings are presented only for an illustrative purpose and in no way limit the present invention.

As a result of assiduous studies, the present inventors have found out that the following method realizes a perpendicular magnetic recording medium which has microscopic magnetic grains with small grain size distribution and good crystallinity, the magnetic grains being well split by a nonmagnetic substance, and which is capable of high-density recording with small transfer noise.

Specifically, a layer made of crystal grains that were regular and small in grain size distribution was obtained in such a manner that a first underlayer made of two kinds or more of oxides was formed, and this layer was annealed in an oxygen atmosphere. The composition ratio, the annealing temperature, and the oxygen density of the oxides were further appropriately controlled, so that the microscopic crystal grains with regulated grain distribution were obtained. Next, a second underlayer for improving crystal orientation was formed on the first under layer. At this time, crystal grains of the second underlayer were grown in a columnar or an island shape on the crystal grains of the first underlayer, and crystal grains of a magnetic layer were further epitaxially grown on the crystal grains of the second underlayer. Consequently, it was possible to obtain the magnetic layer having microscopic magnetic grains uniform in size and well split from one another.

According to an aspect of the present invention, by the annealing in the oxygen atmosphere, the crystal grain size of the first underlayer is made uniform and microscopic. The second underlayer for improving crystal orientation is formed on the first underlayer, and the perpendicular magnetic layer is further formed thereon, so that uniform and microscopic magnetic grains with good crystallinity are provided. Consequently, it is possible to reduce transfer noise of the perpendicular magnetic layer without causing any deterioration in thermal fluctuation resistance to realize noise reduction, which enables higher-density perpendicular magnetic recording.

Figure 1:
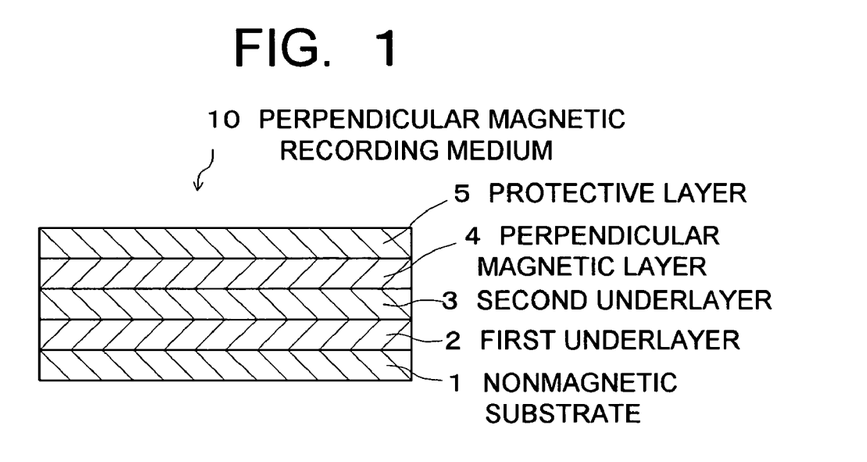
FIG. 1 is a schematic cross-sectional view of a perpendicular magnetic recording medium according to one embodiment of the present invention.

Next, embodiments of the present invention will be described below in detail with reference to the drawings. FIG. 1 schematically shows a cross section of a perpendicular magnetic recording medium 10 according to one embodiment of the present invention. In FIG. 1, the magnetic recording medium 10 has a structure in which a first underlayer 2, a second underlayer 3, a perpendicular magnetic layer 4, and a protective film 5 are stacked in this order on a nonmagnetic substrate 1. Further, a lubricant layer can be formed on a surface of the perpendicular magnetic recording medium 10 if a lubricant such as perfluoropolyether is applied thereon by, for example, a dip method or the like.

In this embodiment, the crystal grain size of the first underlayer 2 is made uniform and microscopic, so that it is possible to make the crystal grains of the perpendicular magnetic layer 4 uniform and microscopic. In the structure such that the first underlayer 2 mainly determining grain size and grain distribution, the second underlayer 3 formed on the first underlayer 2 to control orientation of the crystal grains of the perpendicular magnetic layer 4, and the perpendicular magnetic layer 4 formed on the second underlayer 3 are provided on the nonmagnetic substrate 1, and the perpendicular magnetic layer 4 is epitaxially grown on the second underlayer 3, which makes it possible to introduce the structure of the uniform and microscopic crystal grain size obtained in the first and second underlayers 2, 3 into the perpendicular magnetic layer 4.

In this embodiment, the first underlayer 2 has the grain/grain boundary structure made of two kinds or more of oxides. As a method of forming the first underlayer 2 to be regular and uniform in grain size distribution, the following method, for example, can be selected. A film to be the first underlayer 2 is formed and thereafter annealing is applied in an oxygen atmosphere. Consequently, a film with a certain extent of grain size distribution, or a uniform amorphous film is phase-split in the course of oxidation to turn to a film regular and uniform in crystal grain size.

For phase splitting, it is more preferable that a crystal structure before the annealing is amorphous. This is because annealing, if applied to a system which has been phase-split before the annealing, only promotes the phase splitting and a more microscopic crystal structure cannot be obtained.

Further, it is more preferable that one of or all of two kinds or more of the oxides before the annealing is/are in a metastable state. The metastable oxide here means an oxide that takes a smaller valency than a valency thought to be the most stable, under room temperature in terms of stoichimetry. Further, even a substance having no metastable oxide will do if it is temporarily brought into a metastable state produced by sputtering or the like, or if it is in a state of most lacking in oxygen. Further, depending on a substance, a substance in a state of pure metal not yet oxidized may be used instead of the metastable oxide.

An oxidation reaction of such an oxide in the metastable state can be further promoted in the course of the annealing in the oxygen atmosphere, and this reaction works as a driving force of diffusion (phase-splitting). Therefore, if a stable oxide already exists, the annealing causes little diffusion, which will be an obstacle to the phase-splitting process.

As for the annealing in the oxygen atmosphere, annealing in a pure oxygen atmosphere at an atmospheric pressure is preferable since annealing in the atmosphere would cause inclusion of impurities such as nitrogen. By such annealing, the process time and temperature can be reduced compared with those of annealing in the atmosphere (mixed atmosphere of nitrogen, oxygen, and so on). If the annealing is conducted in a vacuum, it is preferably conducted in a state where a partial pressure of oxygen is as high as possible. As for the temperature, annealing at a temperature range from 400° C. to 700° C. is preferable.

However, by giving further consideration to an oxidation reaction, a lower-temperature process becomes possible. Specifically, in the aforesaid oxidation process, the following three reactions occur: 1. an oxidation reaction occurs in a surface layer; 2. phase-splitting occurs between the oxides; and 3. diffusion toward an inner part of the substance occurs from the surface layer. In 1., an amount of oxygen large enough and temperature high enough to start the oxidation reaction are only required. In 2., a relatively large amount of oxygen is required but the temperature need not be high. In 3, the temperature needs to be high but little oxygen is required. Therefore, annealing at a relatively low temperature range from 300° C. to 400° C. can be applied if the reaction toward the inner part of the substance is not necessary. However, conditions of the annealing greatly differ depending on the thickness and composition ratio of the underlayer, and thus appropriate control is necessary.

Instead of the annealing, an ionization process using scattering or an oxidation process using acid or the like may be adopted. By the annealing, a regular, uniform film can be formed, but in order to form a microscopic film, appropriate control of the composition ratio of the oxides is further required. Though the composition ratio of the oxides depends on each combination, it is preferable to combine an oxide with good crystallinity and an oxide that tends to be amorphous. Consequently, the oxide with good crystallinity forms crystal grains and the oxide that tends to be amorphous forms crystal grain boundaries.

A substance forming the first underlayer 2 can be selected for use from $Fe_2O_3$, $Co_3O_4$, $MgO$, $MoO_3$, $Mn_3O_4$, $SiO_2$, $Al_2O_3$, $TiO_2$, and $ZrO_2$. The use of $Fe_2O_3$, $Co_3O_4$, $MgO$, $MoO_3$, and $Mn_3O_4$ among these chemical compounds as the crystal grains is advantageous in that the microscopic crystal grains are easily formed. The use of $SiO_2$, $Al_2O_3$, $TiO_2$, and $ZrO_2$ as the crystal grain boundaries is suitable for forming the crystal grain boundaries since they tend to be amorphous. In particular, $Fe_2O_3$, $Co_3O_4$, and $MgO$ are preferable as the oxide forming the crystal grains, and $SiO_2$ and $Al_2O_3$ are preferable as a substance forming the crystal grain boundaries. A metastable oxide can be easily produced from $Fe_2O_3$, $Co_3O_4$, $MgO$, while $SiO_2$ and $Al_2O_3$ easily cause oxygen lack as a metastable state, and thus this combination is advantageous since it more easily promotes the phase-splitting reaction.

Preferably, a molar percentage of the oxide forming the crystal grain boundaries relative to all the substances forming the first underlayer 2 is 20% to 50%. More preferably, it is 35% to 45%. A molar percentage of lower 20% is not enough to split the crystal grains, and a molar percentage of higher 50% results in lowered density of the crystal grains when they are split.

Preferably, the first underlayer 2 used in this embodiment has a thickness of 1 nm to 30 nm. A thickness smaller than 1 nm results in deterioration in crystallinity of the first underlayer 2, which leads to poor crystallinity of the magnetic recording layer thereabove, so that noise tends to increase. A thickness over 30 nm causes increase in magnetic grains of the magnetic recording layer, so that noise tends to increase.

As the sputtering method, a single-target sputtering method using a composite target is usable. Also usable is a multitarget sputtering method using targets of respective substances.

Next, the second underlayer 3 for improving crystal orientation is formed on the microscopic, uniform first underlayer 2 obtained here. It is important for the second underlayer 3 to have crystal faces allowing the magnetic layer to epitaxially grow thereon, and the second underlayer 3 needs to selectively grow on the crystal grains of the first underlayer 2. As such a substance, a substance having a face-centered cubic lattice structure or a hexagonal close-packed structure with the closest-packed face appearing is preferable. The second underlayer 3 may have a uniform thickness, or may be non-uniform in an island shape. Further, for still enhanced crystallinity of the second underlayer 3, the first underlayer 2 may be subjected to etching such as a removal process of oxygen covering a surface thereof.

As a substance forming the second underlayer 3 of this embodiment, an alloy containing at least one kind selected from Pt, Pd, and Co is usable. Such an alloy has an advantage of good crystallinity even if the thickness is small.

Further, the second underlayer 3 may take a granular structure in which the aforesaid metal substance contains an oxide, a nitride, and a carbide. That is, the crystal grains made of the aforesaid metal is surrounded by the crystal grain boundaries composed of the oxide, the nitride, and the carbide, so that the grain boundary structure is made distinct, which can promote grain splitting of the magnetic layer formed thereon.

The second underlayer 3 preferably has a thickness of 0.1 nm to 20 nm. A thickness less than 0.1 nm results in poor crystallinity of the second underlayer 3, which leads to poor crystallinity of the magnetic recording layer thereon, so that noise tends to increase. A thickness over 20 nm results in size increase of magnetic grains of the magnetic recording layer, so that noise tends to increase.

Further, the second underlayer 3 may grow in an island shape on the crystal grains of the first underlayer 2.

Further, preferably, a distance between the crystal grains forming the second underlayer 3 differs by within ±10% from a distance between the crystal grains forming the first underlayer 2. If the difference is more than ±10%, it cannot be said that the crystal grains of the second underlayer 3 selectively grow on the crystal grains of the first under layer 2, so that it is not possible to introduce the uniform grain size distribution of the first underlayer 2 to the magnetic layer.

The perpendicular magnetic layer 4 is mainly composed of Co and Pt. Further, the perpendicular magnetic layer 4 may be formed by a stack of two or more layers of magnetic layers different in composition. Further, since the annealing is applied before film deposition, a cooling process may be provided before the film deposition.

A substance forming the perpendicular magnetic layer 4 may be selected for use from a CoPt alloy, a CoCr alloy, a CoCrPt alloy, a CoCrPtB alloy, a CoCrPtTa alloy, a CoCrPt-$SiO_2$ alloy, a CoCrPtO alloy, a CoCrPt-$TiO_2$ alloy, and the like. In particular, the use of the CoCrPt-$SiO_2$ alloy, the CoCrPtO alloy, or the CoCrPt-$TiO_2$ alloy is preferable. These alloys are advantageous in that they are good in crystal orientation, large in magnetic anisotropy, and excellent in resistance against thermal fluctuation. Especially when the magnetic layer contains oxygen, the crystal grain boundaries are made distinct, so that splitting of mutual magnetic actions can be further promoted. The oxygen contents in the magnetic layer in this case preferably falls in a range from 5 at % to 20 at %, with which a good effect thereof can be obtained and deterioration in saturation of magnetization is not prominent.

A lubricant layer can be formed on a surface of the perpendicular magnetic recording medium 10, for example, on a surface of the perpendicular magnetic layer 4 or a surface of the protective layer 5 by coating the surface with a lubricant such as perfluoropolyether by, for example, a dip method or the like.

Figure 2:
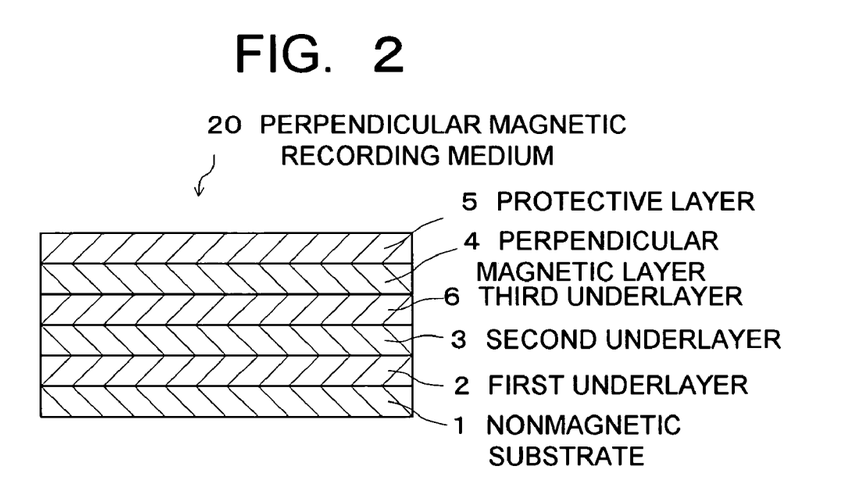
FIG. 2 is a schematic cross-sectional view of a perpendicular magnetic recording medium according to another embodiment of the present invention.

FIG. 2 schematically shows a cross section of a perpendicular magnetic recording medium 20 according to another embodiment of the present invention. The structure shown in FIG. 2 has another layer, namely, a third underlayer 6 provided between the second underlayer 3 and the perpendicular magnetic layer 4 in FIG. 1. This can further improve crystallinity of the magnetic layer.

A substance forming the third underlayer 6 can be selected for use from, for example, Ru, RuCr, Rh, Hf, CoCr, CoCrPt, and CoCrPtB. In particular, the use of an alloy containing Ru, Rh, or Re is preferable. These substances are advantageous in that the magnetic layer easily epitaxially grows thereon.

Figure 3:
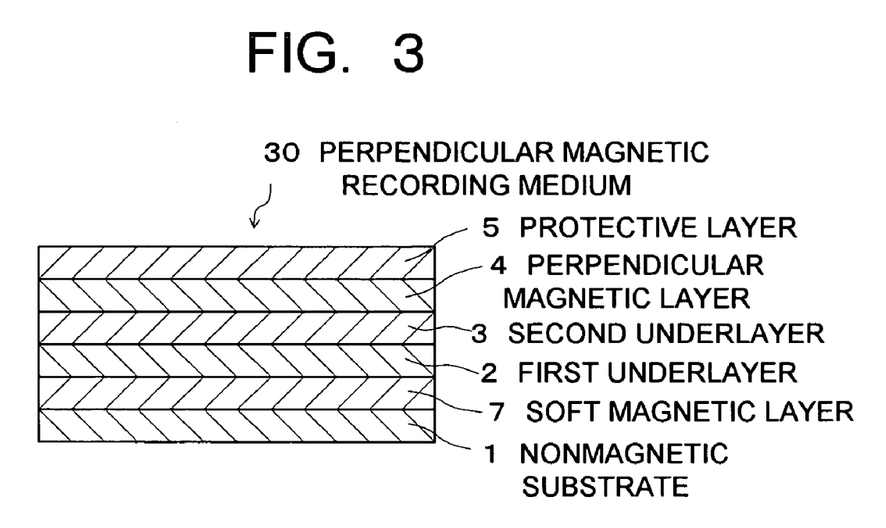
FIG. 3 is a schematic cross-sectional view of a perpendicular magnetic recording medium according to still another embodiment of the present invention.

FIG. 3 schematically shows a cross section of a perpendicular magnetic recording medium 30 according to still another embodiment of the present invention. As shown in FIG. 3, a soft magnetic layer 7 can be interposed between the first underlayer 2 and the nonmagnetic substrate 1 in FIG. 1. Providing the soft magnetic layer 7 high in magnetic permeability results in a so-called perpendicular double-layer medium having a perpendicular magnetic layer on a soft magnetic layer. In this perpendicular double-layer medium, the soft magnetic layer 7 works such that a recording magnetic field from a magnetic head, for example, a single pole head for magnetizing the perpendicular magnetic recording layer horizontally passes therethrough to flow back to the magnetic head side. Thus the soft magnetic layer 7 takes on a part of the function of the magnetic head, and is capable of playing a role of allowing a steep and sufficient perpendicular magnetic field to be applied to the recording layer of the magnetic field to improve efficiency in recording/reproduction.

As a soft magnetic material used for the soft magnetic layer 7, used is a material high in saturation flux density and good in soft magnetic property such as CoZrNb, CoTaZr, FeCoB, FeCoN, FeTaC, FeTaN, FeNi, FeAlSi, or the like.

Figure 4:
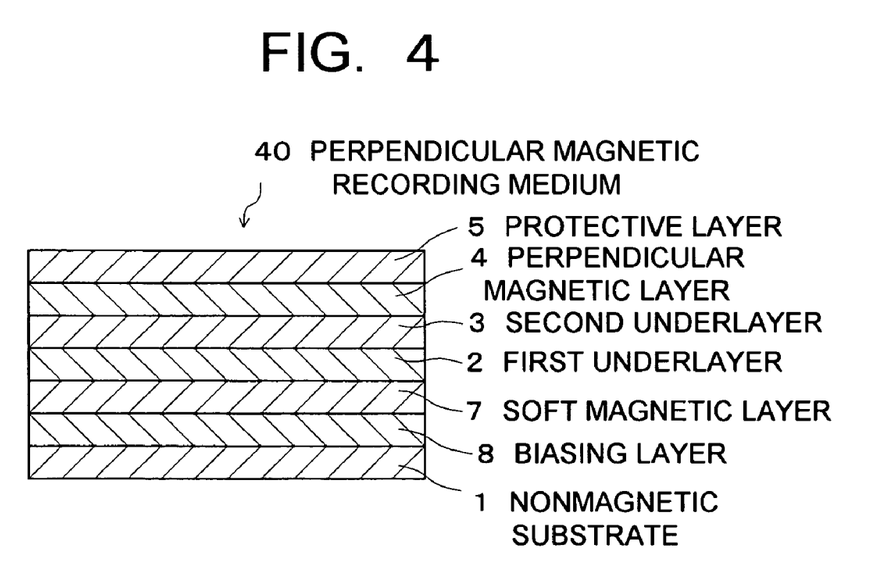
FIG. 4 is a schematic cross-sectional view of a perpendicular magnetic recording medium according to yet another embodiment of the present invention.

Further, as shown in FIG. 4, a biasing layer 8 such as, for example, an in-plane hard magnetic film, an antiferromagnetic layer, or the like can be interposed between the soft magnetic layer 7 and the nonmagnetic substrate 1 shown in FIG. 3. The soft magnetic layer 7 easily forms a magnetic domain and spike noise occurs from this magnetic domain. Therefore, by applying a unidirectional magnetic field in a radial direction of the biasing layer 8, a bias magnetic field is applied to the soft magnetic layer 7 formed thereon, so that the generation of a magnetic domain wall can be prevented. The biasing layer 8 can also take a multilayer structure so that anisotropy is finely dispersed, thereby preventing a large magnetic domain from being easily formed.

As a biasing material used for the biasing layer 8, usable is CoCrPt, CoCrPtB, CoCrPtTa, CoCrPtC, CoCrPtCuB, CoCrRuB, CoCrPtWC, CoCrPtWB, CoCrPtTaNd, CoSm, CoPt, CoPtO, CoCrPtO, CoPt-$SiO_2$, or CoCrPtO-$SiO_2$.

The third underlayer 6, the soft magnetic layer 7, and the biasing layer 8 can all be formed by a film deposition method such as, for example, a sputtering method.

As the nonmagnetic substrate 1, usable is a glass substrate, an Al alloy substrate, a Si substrate with an oxidized surface, a ceramics substrate, a plastic substrate, or the like. Further, the same effects can be expected when a surface of any of these nonmagnetic substrates is plated with a NiP alloy or the like.

At least one layer of the protective layer 5 can be provided on the perpendicular magnetic layer 4. An example of a substance forming the protective layer 5 is C, diamond-like carbon (DLC), SiNx, SiOx, CNx, or CHx.

As the nonmagnetic substrate 1, a substrate made of aluminosilicate glass, chemically strengthened glass, or NiP-plated AlMg is usable. Alternatively, a nonmagnetic substrate with higher heat resistance, for example, a crystallized glass substrate, a Si substrate, a C substrate, a Ti substrate, or the like is usable.

Figure 5:
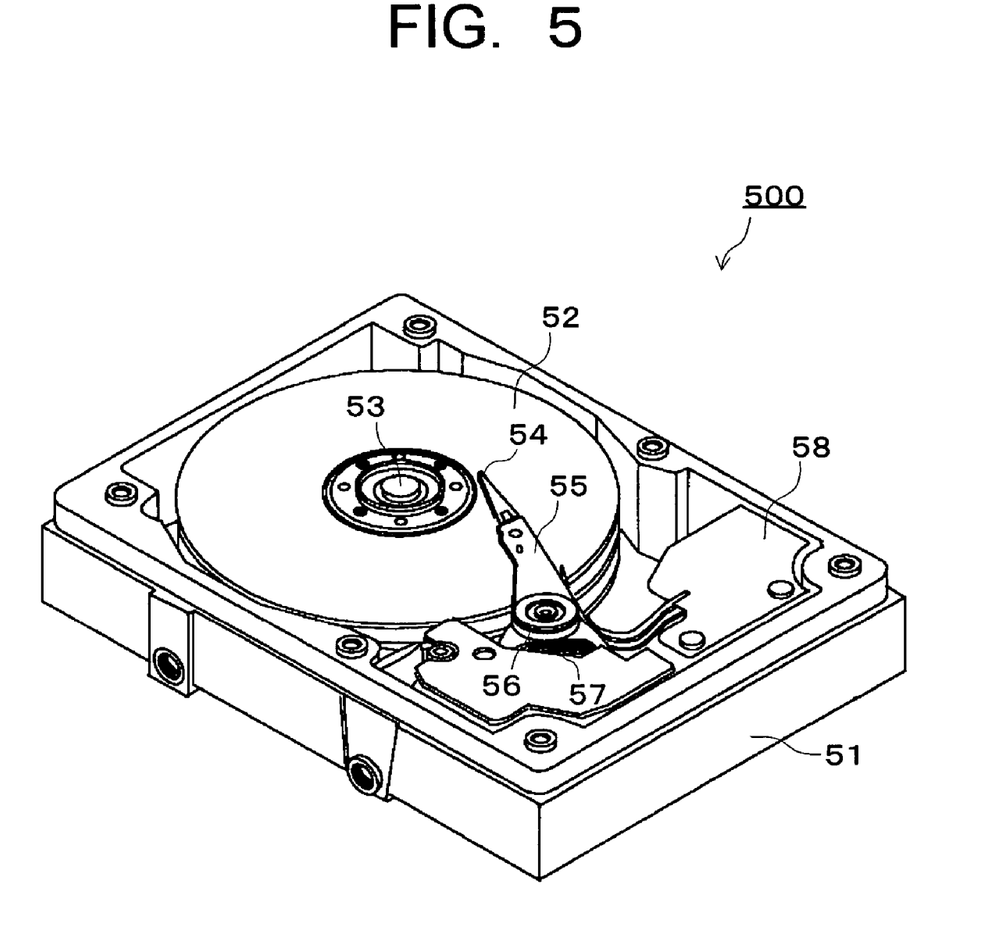
FIG. 5 is a perspective view showing a structure of a magnetic recording/reproducing apparatus according to one embodiment of the present invention, with part thereof being opened.

FIG. 5 shows a perspective view of a magnetic recording/reproducing apparatus according to an embodiment of the present invention, with a part thereof being disassembled. As shown in FIG. 5, this perpendicular magnetic recording apparatus 500 has a casing 51 in a rectangular box shape with an open top face, and a not-shown top cover screwed to the casing 51 with a plurality of screws to close the top opening of the casing 51.

The casing 51 houses therein: a magnetic recording medium 52 using the perpendicular magnetic recording medium according to each of the above-described embodiments; a spindle motor 53 as a driver that supports and rotates the magnetic recording medium 52; a magnetic head 54 recording and reproducing signals to/from the magnetic recording medium 52; a carriage assembly 55 provided with a suspension having the magnetic head 54 at a tip thereof and movably supporting the magnetic head 54 relative to the magnetic recording medium 52; a rotary shaft 56 rotatably supporting the carriage assembly 55; a voice coil motor 57 rotating and positioning the carriage assembly 55 via the rotary shaft 56; and a head amplifier circuit 58.

The perpendicular magnetic recording medium according to each of the embodiments of the present invention is usable as the magnetic recording medium 52 of this perpendicular magnetic recording apparatus 500.

Hereinafter, the embodiments of the present invention will be more concretely described, using examples.

Example 1

A nonmagnetic substrate made of crystallized glass for a 2.5-inch magnetic disk was prepared. This nonmagnetic substrate was placed in a vacuum chamber with a vacuum degree of $1 \times 10^{-5}$ Pa, was heated to the temperature of 250° C., and was subjected to DC magnetron sputtering in an Ar atmosphere at a gas pressure of 0.6 Pa.

First, the nonmagnetic substrate was disposed to face a target, and DC500 W was discharged to the target, thereby forming a Cr layer to a thickness of 40 nm as a backing nonmagnetic layer. A CoCrPt ferromagnetic layer was formed thereon as a biasing layer to have a thickness of 25 nm. On the resultant CoCrPt ferromagnetic layer, a CoZrNb soft magnetic layer with a thickness of 200 nm was formed.

Thereafter, on the CoZrNb soft magnetic layer, a $FeO-SiO_2$ layer as a first underlayer was formed to have a thickness of 10 nm by using a FeO-30 mol % $SiO_2$ target and discharging 500 W.

Thereafter, the resultant workpiece was heated to 500° C. in an oxygen atmosphere at a gas pressure of 2 Pa and was annealed for 3 minutes.

Next, after the substrate was cooled to room temperature, a Pt layer as a second underlayer was formed on the first underlayer to have a thickness of 10 nm by using a Pt target and discharging DC500 W. Next, on the Pt layer, a composite target of (Co-16 at % Pt-10 at % Cr)-8 mol % $SiO_2$ was prepared and a $CoPtCr-SiO_2$ perpendicular magnetic layer was formed on the Pt underlayer to have a thickness of 15 nm. Finally, a C protective layer was formed to have a thickness of 7 nm.

The substrate on which the films were thus continuously deposited in a vacuum chamber is taken out to the atmosphere, a perfluoropolyether lubricant layer was thereafter formed to have a thickness of 1.5 nm by a dip method, and whereby a perpendicular magnetic recording medium was obtained.

Figure 6:
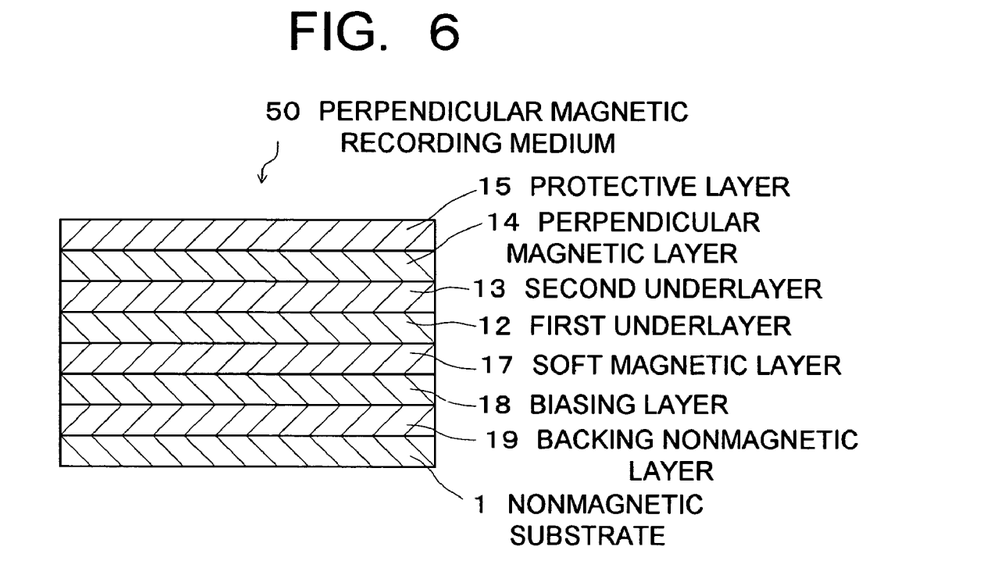
FIG. 6 is a cross-sectional view showing a structure of a perpendicular magnetic recording medium as an example of the embodiments of the present invention.

FIG. 6 shows a schematic cross-sectional view showing a structure of the resultant perpendicular magnetic recording medium. As shown in the drawing, this perpendicular magnetic recording medium 50 has a structure in which a Cr nonmagnetic film 19, a CoCrPt ferromagnetic layer 18, a CoZrNb soft magnetic layer 17, a $FeO-SiO_2$ first underlayer 12, a Pt second underlayer 13, a $CoPtCr-SiO_2$ perpendicular magnetic layer 14, a C protective layer 15, and a not-shown lubricant layer are stacked in this order on a nonmagnetic substrate 1.

First, measurement with a transmission electron microscope (TEM) was conducted on the perpendicular magnetic layer 14 of the resultant perpendicular magnetic recording medium 50, and grain size distributions of crystal grains of the first underlayer 12, the second underlayer 13, and the perpendicular magnetic layer 14 were examined. The evaluation of the grain size distribution on each of the layers followed the following procedure. First, any one image having 100 grains or more at a moderate estimate was taken as image data into a computer from a planar TEM image at a magnification of 500 thousands to 2 millions. This image data was image-processed and a contour of each of the crystal grains is extracted. Then, the number of pixels of an inner part surrounded by the contour was examined. The number of pixels is converted to an area by using the number of pixels per unit area, thereby finding the area occupied by each of the crystal grains. Next, assuming that the crystal grain was circular, the diameter was calculated from the area of each of the crystal grains. Defining the calculated value as the crystal grain size, an average value and a standard deviation of the crystal grain sizes were found. Further, grain boundaries each having a thickness of about 1 nm to 2 nm were observed between the crystal grains. Taking this thickness of the grain boundaries into consideration, an average inter-grain distance was calculated.

The result showed that each of the first underlayer 12, the second underlayer 13, and the perpendicular magnetic layer 14 was formed of the crystal grains with a grain size of about 4 nm and the standard deviation of the grain size distributions thereof was 0.5 nm or less. Further, a difference between the average inter-grain distance in the first underlayer 12 and that in the second underlayer 13 was about 10%.

Next, a planar TEM image taken into the computer in the same manner as in the above was image-processed and was subjected to high-speed two-dimensional Fourier transformation. Then, periodicity of grain arrangement of the first underlayer 12, the second underlayer 13, and the perpendicular magnetic layer 14 was evaluated. It was apparent that in a real-space image before the transformation of each of the first underlayer 12, the second underlayer 13, and the perpendicular magnetic layer 14, there was regularity of hexagonal symmetry. Further, four distinct peaks were observed also in a spectral image after the transformation, which backs up the assumption that grain arrangement has two-dimensional regularity, and judging from the peak arrangement, the grain arrangement is hexagonally symmetric.

Further, local distribution of element density of the first underlayer 12 was examined, using an energy dispersive X-ray spectrometer provided with a transmission electron microscope (TEM-EDX). As a result, it was confirmed that there existed such a structure having: crystal grains mainly composed of $Fe_2O_3$; and crystal grain boundaries mainly composed of $SiO_2$ and surrounding each of the crystal grains.

Next, when X-ray diffraction measurement was conducted on the perpendicular magnetic layer 14, a strong $CoCrPt-SiO_2$ (00.2) peak was observed. Rocking curve measurement conducted on this $CoCrPt-SiO_2$ (00.2) peak showed good crystallinity with a half-value width of the peak being 5°.

Using a magnetizing device provided with an electromagnet, a magnetic field of 1185 A/m (15000 Oe) was applied to the resultant perpendicular magnetic recording medium 50 outwardly in the radial direction of the disk-shaped substrate, thereby magnetizing the ferromagnetic layer of the biasing layer 18 in an in-plane radial direction.

Using a read/write analyzer 1632 and a spinstand S1701 MP manufactured by US GUZIK, a recording/reproducing characteristic was evaluated on the magnetized perpendicular magnetic recording medium 50. As a recording/reproducing head, a single magnetic pole type was used for a recording element, and a magnetoresistance effect was utilized for a reproducing element. The head used had a recording track width of 0.25 μm and a reproducing track width of 0.15 μM. Further, at the time of the measurement, the number of rotations of the disk was set to 4200 rpm and a measured position was fixed at a radial position that is 22.2 mm apart from the center.

As a result, it was possible to obtain a good medium in which SNRm (reproduced signal output S: output with a line recording density of 119 kFCI, Nm: rms value (root mean square) in 716 kFCI) of the medium was 25.5 dB. Further, an attenuation value in a low-frequency range output 50 kFCI, which is an index of thermal fluctuation, was a good value of −0.005 dB/decade.

Comparative Example 1

As a comparative perpendicular magnetic recording medium, a perpendicular magnetic recording medium was obtained in the same manner as that for forming the perpendicular magnetic recording medium 50 of the example 1 except that a Ti layer was formed as a first underlayer to have a thickness of 10 nm by using a Ti target.

The resultant perpendicular magnetic recording medium has the same layer structure as that of the perpendicular magnetic recording medium 50 shown in FIG. 6 except that the first underlayer is different.

TEM measurement was conducted on the first underlayer of the resultant perpendicular magnetic recording medium, and the grain size distribution of magnetic grains in the first underlayer was examined. The result showed that the grain size distribution thereof was 10 nm to 13 nm.

Similarly, TEM measurement also conducted on a second underlayer showed that a difference between an average inter-grain distance in the first underlayer and that in the second underlayer was 20% to 30%. Further, when X-ray diffraction measurement was conducted on a perpendicular magnetic layer thereof, a strong CoCrPt-SiO$_2$ (00.2) peak was observed, but when rocking curve measurement was conducted on this CoCrPt-SiO$_2$ (00.2) peak, a value 10° was obtained as a half value width of the peak.

When a recording/reproducing characteristic was evaluated in the same manner as in the example 1, SNRm was 19.8 dB. Further, a value −0.13 dB/decade was obtained as an attenuation value in a low-frequency range output 50 kFCI.

Therefore, it has been found out that the medium according to the example 1 using two kinds or more of oxides as the first underlayer exhibits a better characteristic than that of the prior medium according to the comparative example 1 using Ti as the first underlayer.

Example 2

As the first underlayer 12, a CoO-30 mol % SiO$_2$ composite target was prepared. A perpendicular magnetic recording medium was fabricated in the same manner as in the example 1 except that the above composite target was used instead of the FeO-30 mol % SiO$_2$ composite target.

The resultant perpendicular magnetic recording medium has the same layer structure as that of the perpendicular magnetic recording medium 50 shown in FIG. 6 except that the first underlayer 12 is different.

TEM observation and image processing were conducted on the first underlayer 12 of the resultant perpendicular magnetic recording medium 50 in the same manner as in the example 1, and the grain size distribution of crystal grains of the first underlayer 12 was examined. The result showed that the first underlayer 12 was formed of crystal grains with a grain size of about 5 nm, and a standard deviation of the grain distribution was 0.8 nm or less. Further, grain boundaries with a thickness of about 1 nm to 2 nm were observed between the crystal grains. When the local distribution of element density of the first underlayer 12 was examined using a TEM-EDX, it was confirmed that there existed such a structure having: crystal grains mainly composed of Co$_3$O$_4$; and crystal grain boundaries mainly composed of SiO$_2$ and surrounding each of the crystal grains. Further, when TEM measurement was conducted also on the second underlayer 13 and the grain size distribution of the second underlayer 13 was examined, a difference between an average inter-grain distance of the crystal grains in the first underlayer 12 and an average inter-grain distance of the crystal grains in the second underlayer 13 was 10% or less.

Next, when X-ray diffraction measurement was conducted on a perpendicular magnetic layer thereof, a strong CoCrPt-SiO$_2$ (00.2) peak was observed. Rocking curve measurement conducted on this CoCrPt-SiO$_2$ (00.2) peak showed good crystallinity with a half-value width of the peak being 4°.

When a recording/reproducing characteristic was evaluated in the same manner as in the example 1, SNRm was 25.5 dB. Further, an attenuation value in a low-frequency range output 50 kFCI was a good value of −0.008 dB/decade.

The same improved effect was also obtained in perpendicular magnetic recording media whose first underlayers 12 were formed by using oxides of various elements represented by X-30 mol %Y composite target (X=MgO, MoO$_3$, Mn$_3$O$_4$, Y=SiO$_2$, Al$_2$O$_3$, TiO, ZrO$_2$) other than CoO-30 mol % SiO$_2$. Note that composite ratio of the oxides X and Y represent a composite ratio in a target and do not represent a composite ratio of the oxides in the film.

Each of the resultant perpendicular magnetic recording media has the same layer structure as that of the perpendicular magnetic recording medium 50 shown in FIG. 6 except that the first underlayer 12 is different.

When on each of the resultant perpendicular magnetic recording media, the local distribution of element density of the first underlayer 12 was examined using a TEM-EDX in the same manner as in the example 1, it was confirmed that there existed such a structure having: crystal grains mainly composed of the aforesaid oxide X; and crystal grain boundaries mainly composed of the aforesaid Y and surrounding each of the crystal grains.

On each of the resultant perpendicular magnetic recording media 50, grain size was examined and a recording/reproducing characteristic was evaluated, using a TEM in the same manner as in the example 1. The following table 1 shows the results.

TABLE 1

| | X component of XY target | Y component of XY target | Grain size (nm) | SNRm (dB) | Thermal fluctuation (dB: decade) |
|---|---|---|---|---|---|
| Example 1 | Fe$_2$O$_3$ | SiO$_2$ | 4 | 25.5 | −0.005 |
| Example 2-1 | Fe$_2$O$_3$ | SiO$_2$ | 5 | 25.3 | −0.008 |
| Example 2-2 | MgO | SiO$_2$ | 5 | 25.0 | −0.009 |
| Example 2-3 | MoO$_3$ | SiO$_2$ | 7 | 22.5 | −0.012 |
| Example 2-4 | Mn$_3$O$_4$ | SiO$_2$ | 6 | 22.9 | −0.011 |
| Example 2-5 | Fe$_2$O$_3$ | Al$_2$O$_3$ | 4 | 25.2 | −0.019 |
| Example 2-6 | Co$_3$O$_4$ | Al$_2$O$_3$ | 5 | 25.0 | −0.013 |
| Example 2-7 | MgO | Al$_2$O$_3$ | 5 | 25.1 | −0.011 |
| Example 2-8 | MoO$_3$ | Al$_2$O$_3$ | 6 | 22.7 | −0.015 |
| Example 2-9 | Mn$_3$O$_4$ | Al$_2$O$_3$ | 6 | 23.4 | −0.010 |
| Example 2-10 | Fe$_2$O$_3$ | TiO | 5 | 24.2 | −0.013 |
| Example 2-11 | Co$_3$O$_4$ | TiO | 6 | 24.1 | −0.012 |
| Example 2-12 | MgO | TiO | 5 | 24.6 | −0.018 |
| Example 2-13 | MoO$_3$ | TiO | 7 | 22.0 | −0.017 |
| Example 2-14 | Mn$_3$O$_4$ | TiO | 7 | 22.2 | −0.019 |
| Example 2-15 | Fe$_2$O$_3$ | ZrO$_2$ | 4 | 24.2 | −0.013 |

TABLE 1-continued

| | X component of XY target | Y component of XY target | Grain size (nm) | SNRm (dB) | Thermal fluctuation (dB: decade) |
|---|---|---|---|---|---|
| Example 2-16 | $Co_3O_4$ | $ZrO_2$ | 6 | 24.1 | −0.011 |
| Example 2-17 | MgO | $ZrO_2$ | 7 | 24.8 | −0.014 |
| Example 2-18 | $MoO_3$ | $ZrO_2$ | 7 | 22.5 | −0.015 |
| Example 2-19 | $Mn_3O_4$ | $ZrO_2$ | 6 | 22.9 | −0.012 |
| Comparative Example 1 | Ti | — | 10-13 | 19.8 | −0.13 |

As seen from Table 1, a better characteristic is exhibited than in the prior medium according to the comparison example 1 when at least one oxide selected from $Fe_2O_3$, $Co_3O_4$, MgO, $MoO_3$, and $Mn_3O_4$ is used as a substance forming the crystal grains of the first underlayer 12, and at least one oxide selected from $SiO_2$, $Al_2O_3$, TiO, $ZrO_2$ is used as a substance forming the crystal grain boundaries of the first underlayer 12.

It is also seen that a still better characteristic is exhibited when an oxide selected from $Fe_2O_3$, $Co_3O_4$, and MgO is used as a substance forming the crystal grains of the first underlayer 12, and an oxide selected from $SiO_2$ and $Al_2O_3$ is used as a substance forming the crystal grain boundaries thereof.

Example 3

As the first underlayer 12, MgO-40 mol % $SiO_2$ composite targets were prepared. Perpendicular magnetic recording media were fabricated in the same manner as in the example 1 except that the MgO-40 mol % $SiO_2$ composite targets were used instead of the FeO-30 mol % $SiO_2$ composite target and film thickness was variously changed.

Each of the resultant perpendicular magnetic recording media has the same layer structure as that of the perpendicular magnetic recording medium 50 shown in FIG. 6 except that the first underlayer 12 is different.

On each of the various perpendicular magnetic recording media that were obtained, the grain size distribution was measured and a recording/reproducing characteristic was evaluated in the same manner as in the example 1.

Figure 7:
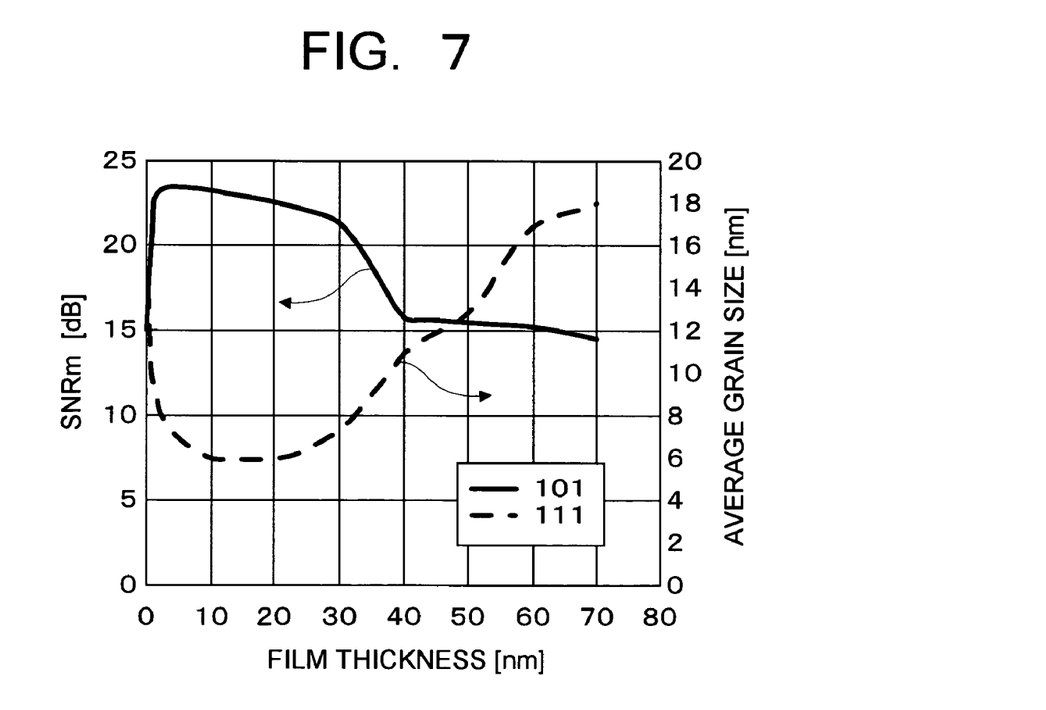
FIG. 7 is a graph showing the correlation between film thickness and SNRm and between film thickness and crystal grain size in a first underlayer of MgO-40 mol % $SiO_2$.

FIG. 7 shows a graph representing the correlation between film thickness and SNRm and between film thickness and crystal grain size in the first underlayer of MgO-40 mol % $SiO_2$. Curves 101, 111 are graphs representing the respective results when film thickness is x nm ($0 \leq x \leq 70$).

As seen from the graphs, better SNRm and average grain size are obtained when the thickness of the first underlayer 12 falls within a range from 1 nm to 30 nm.

Example 4

As the first underlayer 12, CoO-x mol % $Al_2O_3$ composite targets different in composition ratio (10 mol % $\leq x \leq 70$ mol %) were prepared. Perpendicular magnetic recording media were fabricated in the same manner as in the example 1 except that the CoO-x mol % $Al_2O_3$ composite targets were used instead of the FeO-30 mol % $SiO_2$ composite target and the composition ratio was variously changed.

Each of the resultant perpendicular magnetic recording media has the same layer structure as that of the perpendicular magnetic recording medium 50 shown in FIG. 6 except that the first underlayer 12 is different.

When the local distribution of element density of the first underlayer 12 was examined on each of the resultant perpendicular magnetic recording media, using a TEM-EDX in the same manner as in the example 1, it was confirmed that there existed such a structure having: crystal grains mainly composed of $Co_3O_4$; and crystal grain boundaries mainly composed of $Al_2O_3$ and surrounding each of the crystal grains.

Grain size distribution was measured and a recording/reproducing characteristic was evaluated on each of the various perpendicular magnetic recording media that were obtained, in the same manner as in the example 1.

Figure 8:
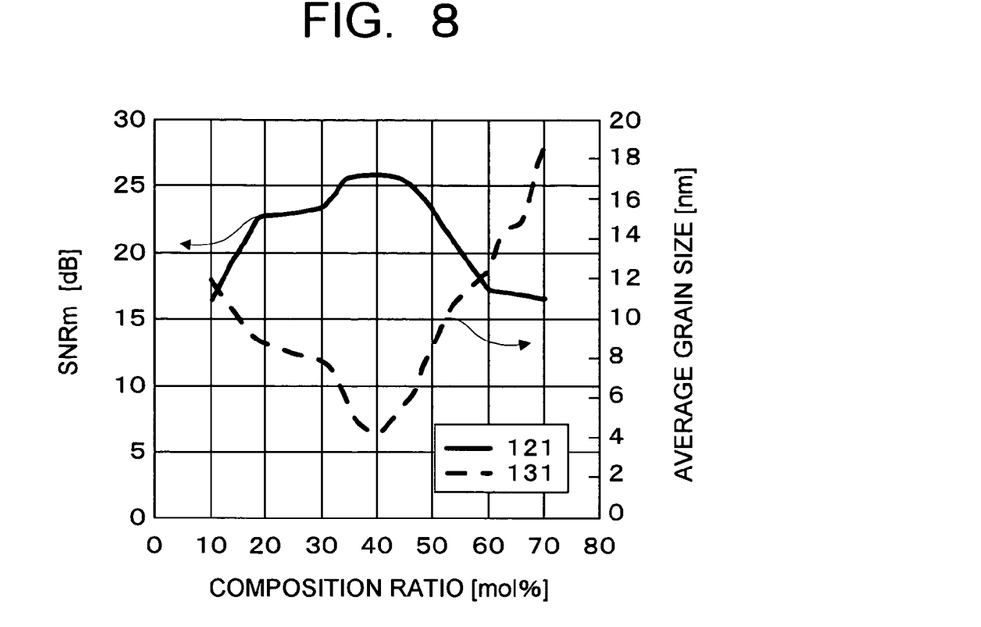
FIG. 8 is a graph showing the correlation between composition ratio and SNRm and between composition ratio and crystal grain size in a first underlayer of CoO-x mol % $Al_2O_3$.

FIG. 8 shows a graph representing the correlation between composition ratio and SNRm and between composition ratio and crystal grain size in the first underlayer of CoO-x mol % $Al_2O_3$. Curves 121, 131 are graphs representing the respective results when the composite ratio is x mol % ($10 \leq x \leq 70$).

As seen from the graphs, better SNRm and average grain size are obtained when the composite ratio of an oxide forming the crystal grain boundaries of the first underlayer 12 falls within a range from 20 mol % to 50 mol %.

Example 5

As the second underlayer 13, targets made of Pd and Co respectively were prepared. Perpendicular magnetic recording media were fabricated in the same manner as in the example 1 except that the targets of these various substances were used instead of the Pt target.

Next, for comparison, a perpendicular magnetic recording medium as an existing perpendicular magnetic recording medium was fabricated in the same manner as that for forming the perpendicular magnetic recording medium 50 of the example 1 except that a Ru layer was formed as the second underlayer to have a thickness of 10 nm, by using a Ru target.

Each of the perpendicular magnetic recording media of this example and that in the comparative example have the same layer structure as that of the perpendicular magnetic recording medium 50 shown in FIG. 6 except that the second underlayer 12 is different.

On each of the resultant media of this example and the perpendicular magnetic recording medium of the comparative example, grain size was measured and a recording/reproducing characteristic was evaluated in the same manner as in the example 1. The following table 2 shows the results.

TABLE 2

| | Second underlayer | Grain size (nm) | SNRm (dB) |
|---|---|---|---|
| Example 1 | Pt | 6 | 25.2 |
| Example 4-1 | Pd | 6 | 25.0 |
| Example 4-2 | Co | 6 | 24.8 |
| Comparative Example 2 | Ru | 12 | 18.8 |

As seen from Table 2, a better characteristic is exhibited than in the existing medium when Pt, Pd, or Co is used as the second underlayer 12.

Example 6

As the second underlayer 13, Pd-10 mol % X targets (X=$Cr_2O_3$, MgO, $SiO_2$, TiO, $Y_2O_3$, TaC, TiC, AlN, $Si_3O_4$, TaN) were prepared. Perpendicular magnetic recording media were fabricated in the same manner as in the example 1 except that the Pd-10 mol % X targets were used instead of the Pt target and various Pd alloys were used.

Each of the resultant perpendicular magnetic recording media has the same layer structure as that of the perpendicular magnetic recording medium 50 shown in FIG. 6 except that the second underlayer 13 is different.

When on each of the resultant perpendicular magnetic recording media, the local distribution of element density of the second underlayer 13 was examined using a TEM-EDX, it was confirmed that there existed such a structure having: crystal grains mainly composed of Pd; and crystal grain boundaries mainly composed of a chemical compound represented by X and surrounding each of the crystal grains.

Grain size distribution was measured and a recording/reproducing characteristic was evaluated on each of the various perpendicular magnetic recording media that were obtained, in the same manner as in the example 1.

Grain size distribution was measured and a recording/reproducing characteristic was evaluated on each of the resultant media of this example and the perpendicular magnetic recording medium of the comparative example in the same manner as in the example 1. The following Table 3 shows the results.

TABLE 3

|  | Second underlayer | X target | Grain size (nm) | SNRm (dB) |
| --- | --- | --- | --- | --- |
| Example 6-1 | Pd | $Cr_2O_3$ | 5 | 24.5 |
| Example 6-2 | Pd | MgO | 6 | 24.7 |
| Example 6-3 | Pd | $SiO_2$ | 4 | 25.2 |
| Example 6-4 | Pd | TiO | 4 | 25.3 |
| Example 6-5 | Pd | $Y_2O_3$ | 4 | 25.1 |
| Example 6-6 | Pd | TaC | 5 | 24.4 |
| Example 6-7 | Pd | TiC | 6 | 24.1 |
| Example 6-8 | Pd | AlN | 5 | 24.7 |
| Example 6-9 | Pd | $Si_3N_4$ | 6 | 24.0 |
| Example 6-10 | Pd | TaN | 6 | 24.3 |
| Comparative Example 3 | Pd | — | 12 | 18.8 |

As seen from Table 3, a better characteristic is exhibited than in the existing medium when a Pd alloy with a granular structure is used as the second underlayer 13. Further, it has been also found out that a substance forming the crystal grain boundaries is preferably an oxide, a carbide, or a nitride.

Example 7

As the second underlayer 13, Pd targets were prepared. Perpendicular magnetic recording media were fabricated in the same manner as in the example 1 except that the Pd targets were used instead of the Pt target and the film thickness was variously changed.

Each of the resultant perpendicular magnetic recording media has the same layer structure as that of the perpendicular magnetic recording medium 50 shown in FIG. 6 except that the second underlayer 13 is different.

Figure 9:
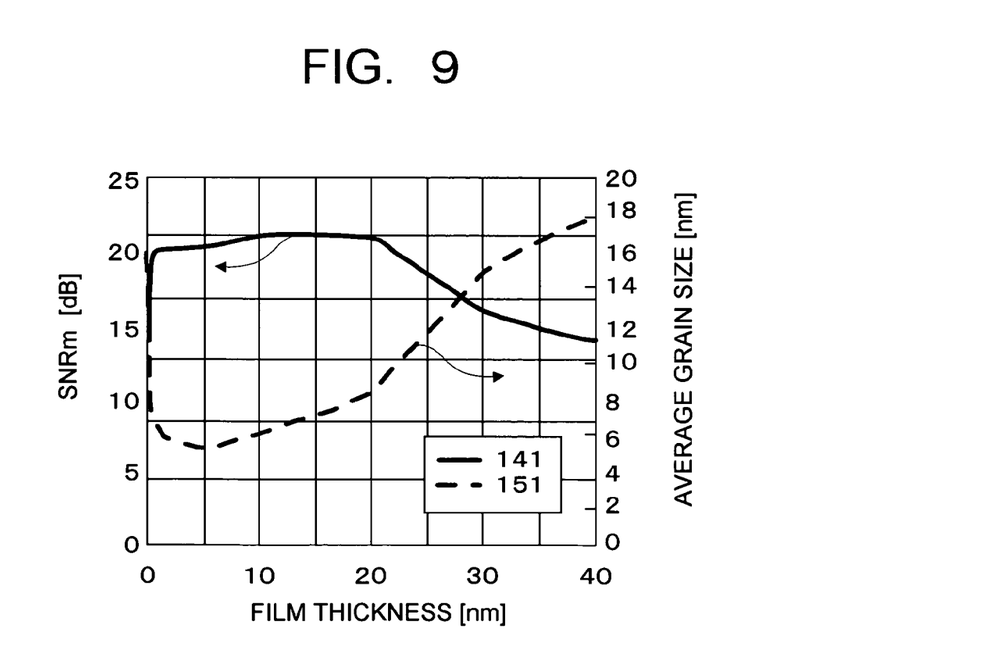
FIG. 9 is a graph showing the correlation between film thickness and SNRm and between film thickness and crystal grain size in a second underlayer of Pd.

Grain size distribution was measured and a recording/reproducing characteristic was evaluated on each of the various perpendicular magnetic recording media that were obtained, in the same manner as in the example 1. FIG. 9 shows a graph representing the correlation between film thickness and SNRm and between film thickness and crystal grain size in the Pd second underlayer. Curves 141, 151 are graphs representing the respective results when the film thickness is x nm ($0 \leq x \leq 40$). As seen from the graphs, better SNRm and average grain size are obtained when the thickness of the second underlayer 13 falls within a range from 0.1 nm to 20 nm.

Example 8

As the second underlayer 13, a Pt target was prepared. A perpendicular magnetic recording medium was fabricated in the same manner as in the example 1 except that the second underlayer 13 was formed to have a thickness of 1 nm by using the Pt target under a sputtering Ar gas pressure of 3 Pa.

TEM measurement of a cross section conducted on the resultant perpendicular magnetic recording medium showed that Pt grains were formed in an island shape in crystal grain portions of the first under layer 12. Further, it was found that the perpendicular magnetic layer 14 epitaxially grew on the Pt islands. The resultant perpendicular magnetic recording medium has the same layer structure as that of the perpendicular magnetic recording medium 50 shown in FIG. 6 except that the second underlayer is formed in the island shape.

When a recording/reproducing characteristic was evaluated on the resultant perpendicular magnetic recording medium in the same manner as in the example 1, it was found that a good characteristic with SNRm of 24.9 dB was exhibited.

Example 9

As a perpendicular magnetic recording medium, a perpendicular magnetic recording medium of this example was obtained in the same manner as in the example 1 except that the second underlayer 13, the perpendicular magnetic layer 14, and the protective layer 15 were formed after the annealing without any cooling process to room temperature, and at this time, as the perpendicular magnetic layer 14, a CoCrPtB perpendicular magnetic layer 14 was formed to have a thickness of 15 nm instead of the CoPtCr-$SiO_2$ perpendicular magnetic layer, by using a Co-18 at % Cr-16 at % Pt-1 at % B target. The resultant perpendicular magnetic recording medium has the same layer structure as that of the perpendicular magnetic recording medium 50 shown in FIG. 6 except that the perpendicular magnetic layer 14 is different When a recording/reproducing characteristic was evaluated on the resultant perpendicular magnetic recording medium in the same manner as in the example 1, it was found that a good characteristic with SNRm of 24.7 dB was exhibited.

Example 10

A perpendicular magnetic recording medium was fabricated in the same manner as in the example 1 except that a Ru target was prepared and a third underlayer was formed between the second underlayer 13 and the perpendicular magnetic layer 14 to have a thickness of 15 nm.

Figure 10:
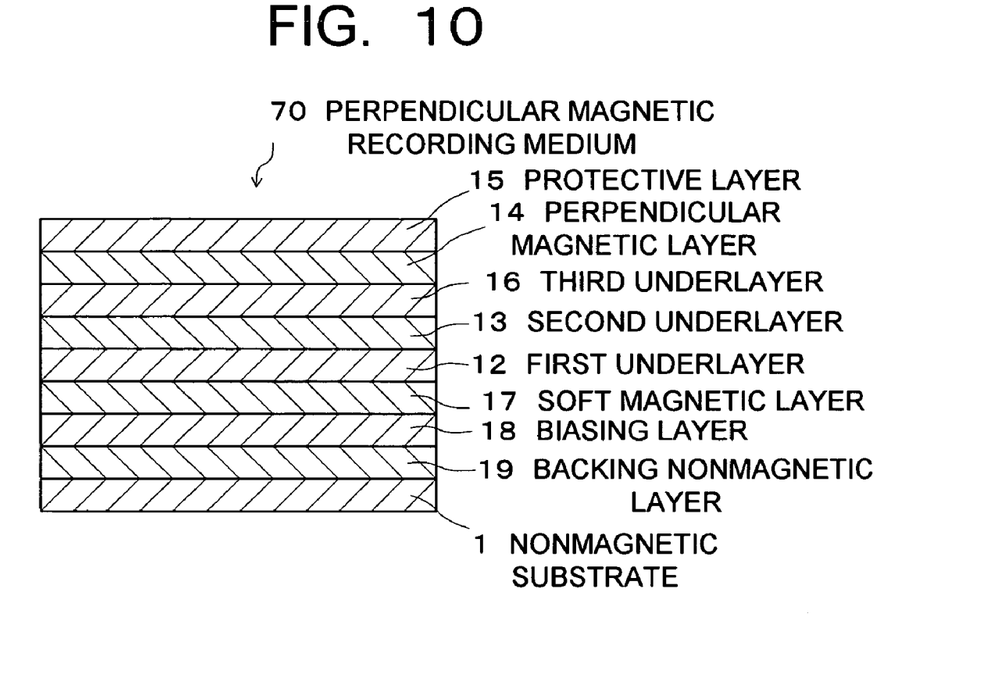
FIG. 10 is a cross-sectional view showing a structure of a perpendicular magnetic recording medium as another example of the embodiments of the present invention.

FIG. 10 shows a schematic cross-sectional view showing a structure of the resultant perpendicular magnetic recording medium. As shown in the drawing, this perpendicular magnetic recording medium 70 has the same structure as that of the perpendicular magnetic recording medium 50 shown in FIG. 6 except that the Ru third underlayer 16 is formed between the Pt second underlayer 13 and the CoPtCr-$SiO_2$ perpendicular magnetic layer 14.

When a recording/reproducing characteristic was evaluated on the resultant perpendicular magnetic recording medium in the same manner as in the example 1, it was found that a good characteristic with SNRm of 25.6 dB was exhibited.

Further, the use of Rh or Re instead of Ru also provided the same improved effect.

Example 11

As a perpendicular magnetic recording medium, a perpendicular magnetic recording medium was fabricated in the same manner as in the example 1 except that the heat treatment prior to the film deposition was not applied and none of the Cr nonmagnetic layer, the CoCrPt ferromagnetic layer, and the CoZrNb soft magnetic layer was formed.

Figure 11:
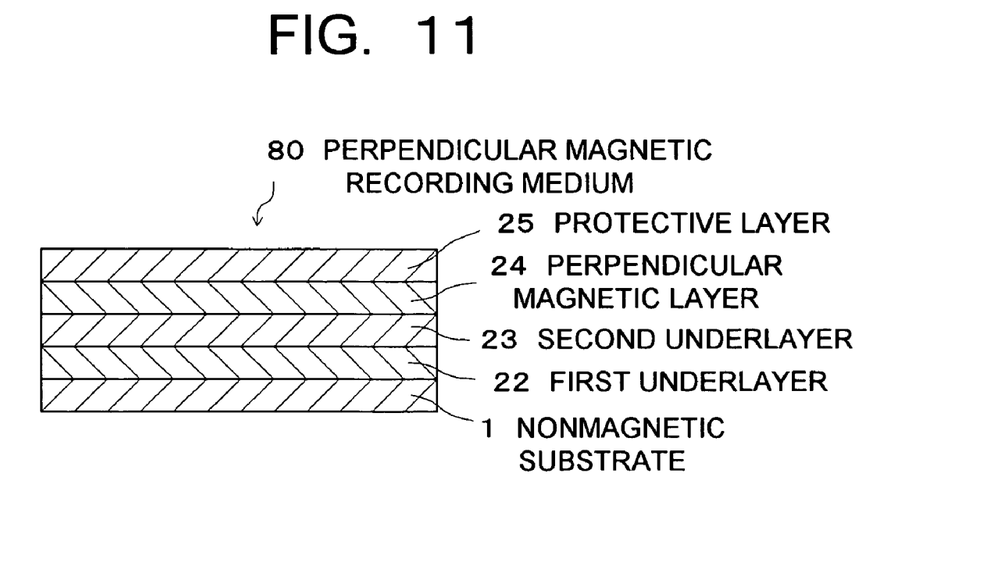
FIG. 11 is a cross-sectional view showing a structure of a perpendicular magnetic recording medium as still another example of the embodiments of the present invention.

FIG. 11 shows a schematic cross-sectional view showing a structure of the resultant perpendicular magnetic recording medium. As shown in the drawing, a perpendicular magnetic recording medium 80 has a structure in which a FeO-SiO$_2$ first underlayer 22, a Pt second underlayer 23, a CoPtCr-SiO$_2$ perpendicular magnetic layer 24, a C protective layer 25, and a not-shown lubricant layer are stacked in this order on a nonmagnetic substrate 1.

When on this perpendicular magnetic recording medium 80, a recording/reproducing characteristic was evaluated using a ring-type head with a recording track width of 0.25μ and a reproducing track width of 0.15 μm, the ring head utilizing a magnetoresistance effect, SNRm was 21.5 dB.

Comparative Example 2

An existing perpendicular magnetic recording medium was obtained in the same manner as in the example 11 except that a Ti first underlayer was formed as a first underlayer to have a thickness of 10 nm by using a Ti target.

The resultant perpendicular magnetic recording medium has the same layer structure as that of the perpendicular magnetic recording medium 80 shown in FIG. 11 except that the first underlayer is different.

When on the resultant perpendicular magnetic recording medium, a recording/reproducing characteristic was evaluated using a ring-type head with a recording track width of 0.25μ and a reproducing track width of 0.15 μm, the ring-type head utilizing a magnetoresistance effect, SNRm was 16.8 dB.

It should be understood that the present invention is not limited to the specific forms described above with illustration and all the changes which come within the range of equivalency of the following claims are therefore intended to be embraced therein.

What is claimed is:

1. A perpendicular magnetic recording medium, comprising:
    a nonmagnetic substrate;
    a first underlayer formed on the nonmagnetic substrate, mainly composed of at least two kinds selected from a group consisting of Fe$_2$O$_3$, Co$_3$O$_4$, MgO, MoO$_3$, Mn$_3$O$_4$, SiO$_2$, Al$_2$O$_3$, TiO$_2$, and ZrO$_2$, and having crystal grains growing in a columnar shape and crystal grain boundaries surrounding the crystal grains, the crystal grains mainly containing at least one kind selected from a group consisting of Fe$_2$O$_3$, Co$_3$O$_4$, MgO, MoO$_3$, and Mn$_3$O$_4$, the crystal grain boundaries mainly containing at least one kind selected from a group consisting of SiO$_2$, Al$_2$O$_3$, TiO$_2$, and ZrO$_2$;
    a nonmagnetic second underlayer formed on the first underlayer and having crystal grains with one of a face-centered cubic structure and a hexagonal close-packed structure growing on the crystal grains of the first underlayer;
    a third underlayer formed on the second underlayer and mainly composed of at least one kind selected from a group consisting of Ru, Rh, and Re;
    a magnetic layer formed on the third underlayer; and
    a protective film formed on the magnetic layer.

2. The perpendicular magnetic recording medium as set forth in claim 1, wherein the second underlayer is mainly composed of an alloy containing one kind selected from a group consisting of Pt, Pd, and Co.

3. The perpendicular magnetic recording medium as set Forth in claim 1,
    wherein the crystal grains of the first underlayer contain at least one kind selected from a group consisting of Fe$_2$O$_3$, Co$_3$O$_4$, and MgO, and
    wherein the crystal grain boundaries of the first underlayer contain at least one of SiO$_2$ and Al$_2$O$_3$.

4. The perpendicular magnetic recording medium as set forth in claim 1, wherein a molar percentage of the crystal grain boundaries of the first underlayer is 20% to 50% relative to all of the first underlayer.

5. The perpendicular magnetic recording medium as set forth in claim 1, wherein a molar percentage of the crystal grain boundaries of the first underlayer is 35% to 45% relative to all of the first underlayer.

6. The perpendicular magnetic recording medium as set forth in claim 1, wherein the crystal grains of the first underlayer have regular arrangement in an in-plane direction parallel to the nonmagnetic substrate.

7. The perpendicular magnetic recording medium as set forth in claim 1, wherein the first underlayer has a thickness of 1 nm to 30 nm.

8. The perpendicular magnetic recording medium as set forth in claim 1, wherein the second underlayer has a granular structure in which the crystal grains of the second underlayer grow in a columnar shape and the columnar crystal grains are split by crystal grain boundaries made of one of an oxide, a nitride, and a carbide.

9. The perpendicular magnetic recording medium as set forth In claim 1, wherein the second underlayer has a thickness of 0.1 nm to 20 nm.

10. The perpendicular magnetic recording medium as set forth in claim 1, wherein the crystal grains of the second underlayer grow in an island shape on the crystal grains of the first underlayer.

11. The perpendicular magnetic recording medium as set forth in claim 1, wherein a difference between an average inter-grain distance in the crystal grains of the second underlayer and an average inter-grain distance in the crystal grains of the first underlayer is within ±10%.

12. The perpendicular magnetic recording medium as set forth in claim 1, wherein the magnetic layer has magnetic crystal grains mainly composed of a CoPt alloy.

13. The perpendicular magnetic recording medium as set forth in claim 12, wherein the magnetic layer contains 5 at. % to 20 at. % oxygen.

14. The perpendicular magnetic recording medium as set forth in claim 1, wherein the magnetic layer has magnetic crystal grains with an average grain size of 1 nm to 10 nm.

15. The perpendicular magnetic recording medium as set forth in claim 1, wherein the magnetic layer has magnetic crystal grains and the magnetic crystal grains have regular arrangement in an in-plane direction parallel to the nonmagnetic substrate.

16. The perpendicular magnetic recording medium as set forth in claim 1, further comprising at least one layer of soft magnetic layer formed between the nonmagnetic substrate and the first underlayer.

17. A magnetic recording/reproducing apparatus, comprising:

a perpendicular magnetic recording medium that comprises: a nonmagnetic substrate; a first underlayer formed on the nonmagnetic substrate, mainly composed of at least two kinds selected from a group consisting of $Fe_2O_3$, $Co_3O_4$, MgO, $MoO_3$, $Mn_3O_4$, $SiO_2$, $Al_2O_3$, $TiO_2$, and $ZrO_2$, and having crystal grains growing in a columnar shape and crystal grain boundaries surrounding the crystal grains, the crystal grains mainly containing at least one kind selected from a group consisting of $Fe_2O_3$, $Co_3O_4$, MgO, $MoO_3$, and $Mn_3O_4$, the crystal grain boudaries mainly containing at leqst one kind selected from a group consisting of $SiO_2$, $Al_2O_3$, $TiO_2$, and $ZrO_2$; nonmagnetic second underlayer and having crystal grains with one of a face-centered cubic structure and a hexagonal close-packed structure growing on the crystal grains of the first underlayer; a third underlayer formed on the second underlayer and mainly composed of at least one kind selected from a group consisting of Ru,Rh, and Re; a magnetic layer formed on the third underlayer; and a protective film formed on the magnetic layer;

a mechanism supporting and rotary-driving the perpendicular magnetic recording medium;

a magnetic head having: an element recording data to the perpendicular magnetic recording medium; and an element reproducing recorded data from the perpendicular magnetic recording medium; and a carriage assembly supporting the magnetic head movably relative to the perpendicular magnetic recording medium.

18. The magnetic recording/reproducing apparatus as set forth in claim 17, wherein the magnetic head has a single-pole recording head.

* * * * *